United States Patent [19]

Lyke

[11] Patent Number: 5,905,616
[45] Date of Patent: May 18, 1999

[54] LOAD SELECTIVITY SYSTEM FOR USE WITH ELECTRONIC TRIP CIRCUIT BREAKERS

[75] Inventor: Andrew J. Lyke, Doraville, Ga.

[73] Assignee: Square D Company, Palatine, Ill.

[21] Appl. No.: 09/088,697

[22] Filed: Jun. 1, 1998

[51] Int. Cl.$^6$ ..................................................... H02H 3/00
[52] U.S. Cl. ................................ 361/64; 361/68; 361/94; 361/102; 307/39
[58] Field of Search ................................ 361/93–97, 102, 361/62–70, 81, 85–87, 78; 307/129–131, 35, 39

[56] References Cited

U.S. PATENT DOCUMENTS

| | | | |
|---|---|---|---|
| 4,321,681 | 3/1982 | Sackin et al. | 361/68 |
| 4,468,714 | 8/1984 | Russell | 361/62 |
| 5,151,842 | 9/1992 | DeBiasi et al. | 361/93 |
| 5,414,640 | 5/1995 | Seem | 364/493 |
| 5,734,576 | 3/1998 | Klancher | 361/63 |

*Primary Examiner*—Jeffrey Gaffin
*Assistant Examiner*—Michael J. Sherry
*Attorney, Agent, or Firm*—Larry I. Golden; Kareem M. Irfan

[57] ABSTRACT

A circuit breaker interconnect arrangement and a method for selective interruption of electrical circuits includes at least one upstream circuit breaker having an upstream electronic trip unit and a microprocessor and a plurality of downstream circuit breakers connected to the upstream circuit breaker. The microprocessor transmits a trip command signal to the downstream electronic trip units at the occurrence of a predetermined load condition, such as an overload condition, through the upstream circuit. One or more downstream circuit breakers are tripped after the predetermined time delay for tripping according to a predetermined priority until the load condition through the upstream circuit is reduced below the predetermined load condition whereby the upstream circuit breaker is deterred from interrupting current in the upstream circuit. In one embodiment of the present invention, at the occurrence of the overload condition through the upstream circuit, a determination is made as to whether the overload condition through the upstream circuit is due to an overload condition through one or more of the downstream circuits wherein the corresponding downstream circuit breakers are tripped. In another embodiment of the present invention, the downstream circuits are designated as critical or sheddable. At the occurrence of a predetermined load condition through the upstream circuit, the microprocessor transmits the trip command signal to the sheddable downstream circuit breakers first according to a predetermined priority.

19 Claims, 3 Drawing Sheets

LOAD SELECTIVITY SYSTEM FOR USE WITH ELECTRONIC TRIP CIRCUIT BREAKERS

BACKGROUND OF THE INVENTION

1. Field of the Invention

This invention relates generally to load selectivity and shedding systems, particularly for use with electronic trip circuit breaker interconnect arrangements.

2. Description of the Related Art

The primary concern in determining the appropriate circuit protective devices for use in an electrical power distribution system is protection of the distribution system in the event of a fault precipitating abnormal overcurrent condition. The concern is to prevent or at least minimize damage to the system, including its conductors and connected loads. Equipment failure, human error, or emergencies of natural origin may cause such a fault. Typically, such faults are unpredictable, and thus the selected circuit protective devices must function automatically to fully protect the system, and incidentally to protect personnel and property against the consequential hazards of such faults.

Another principle concern with the circuit protection devices to be used is minimizing the extent and duration of electrical service interruption in the event of an overcurrent or a fault condition. Typically, two or more circuit protection devices are placed between a fault and the source of the fault current. In order to minimize electrical service interruption, the protective devices are selective in response such that the one nearest the fault will first attempt to interrupt the fault current. If this protective device does not clear the fault in a timely fashion, the next upstream protective device will attempt to do so, and so on. This response selectivity is termed system selective coordination.

For example, if a downstream circuit is brought into overload, this overload condition may force an upstream breaker running near trip point into an overload condition. Functioning as intended, the upstream circuit breaker may trip before the downstream circuit breaker clears the overload. Consequently, a number of circuits in a lower level downstream zone may be taken down as a result of an overload on only one downstream circuit. If the lower level or downstream circuit breaker could be forced to trip first, then the upstream circuit and remaining branch downstream circuits would stay on line.

Typically, incorporating a zone selective interlock (ZSI) system allows the circuit breakers to communicate with each other ensuring that the breaker closest to the fault clears the fault. ZSI functions in an electrical system typically provide for a lower level "downstream" zone to send a restraint signal up to higher level "upstream" zone circuit breakers, wherein the upstream circuit breakers would be restrained from tripping, allowing the downstream circuit breaker to trip to minimize interruption of the electrical system.

The ZSI system view is "upstream" providing a restraint to the upstream breaker. ZSI systems for electronic trip circuit breakers provide for protection in fault or ground fault situations, however, the ZSI systems do not provide for orderly priority shedding of non-critical loads when a system is in overload. Accordingly, a selectivity system for electronic trip circuit breakers is needed which provides signals in a "downstream" view and allows progressive shedding of non-critical loads as well as instantaneous relief.

SUMMARY OF THE INVENTION

A circuit breaker interconnect arrangement for an electrical circuit system and a method for selective interruption of the circuits in the electrical circuit system is disclosed according to the present invention. The system of the present invention includes at least one upstream circuit breaker having an upstream electronic trip unit including a microprocessor for interrupting current through a protected upstream circuit in the electrical circuit system. A plurality of downstream circuit breakers are connected to the upstream circuit breaker for interrupting current through corresponding protected downstream circuits. Each downstream circuit breaker has a downstream electronic trip unit including a predetermined time delay for tripping. The microprocessor transmits a trip command signal to the downstream electronic trip units, for example, at the occurrence of a predetermined load condition, such as an overload condition, through the upstream circuit. One or more downstream circuit breakers are tripped after the predetermined time delay for tripping wherein current is interrupted through the corresponding protected downstream circuits. For example, the current is interrupted in the downstream circuits until the load condition through the upstream circuit is reduced below the predetermined load condition whereby the upstream circuit breaker is deterred from interrupting current in the upstream circuit.

In another embodiment of the present invention, at the occurrence of the overload condition through the upstream circuit, a determination is made as to whether the overload condition through the upstream circuit is due to an overload condition through one or more of the downstream circuits. The microprocessor transmits the trip command signal to the downstream electronic trip units corresponding to the downstream circuits in the overload condition. The downstream circuit breakers corresponding to the downstream circuits in the overload condition are tripped after the predetermined time delay for tripping, which, for example, is set at an immediate trip setting for an overload condition. The current is interrupted through the downstream circuits in the overload condition until the load condition at the upstream circuit is reduced below the overload condition whereby the upstream circuit breaker is deterred from interrupting current in the upstream circuit.

In another embodiment of the present invention, one or more downstream circuits are designated as critical and one or more downstream circuits are designated as sheddable. At the occurrence of a predetermined load condition through the upstream circuit, the microprocessor transmits the trip command signal to the downstream electronic trip units wherein the downstream circuit breakers corresponding to the sheddable downstream circuits are tripped before the downstream circuit breakers corresponding to the critical downstream circuits. Current in the sheddable downstream circuits and the critical downstream circuits are interrupted according to a predetermined priority until the load condition at the upstream circuit is reduced below the predetermined load condition whereby the upstream circuit breaker is deterred from interrupting current in said upstream circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
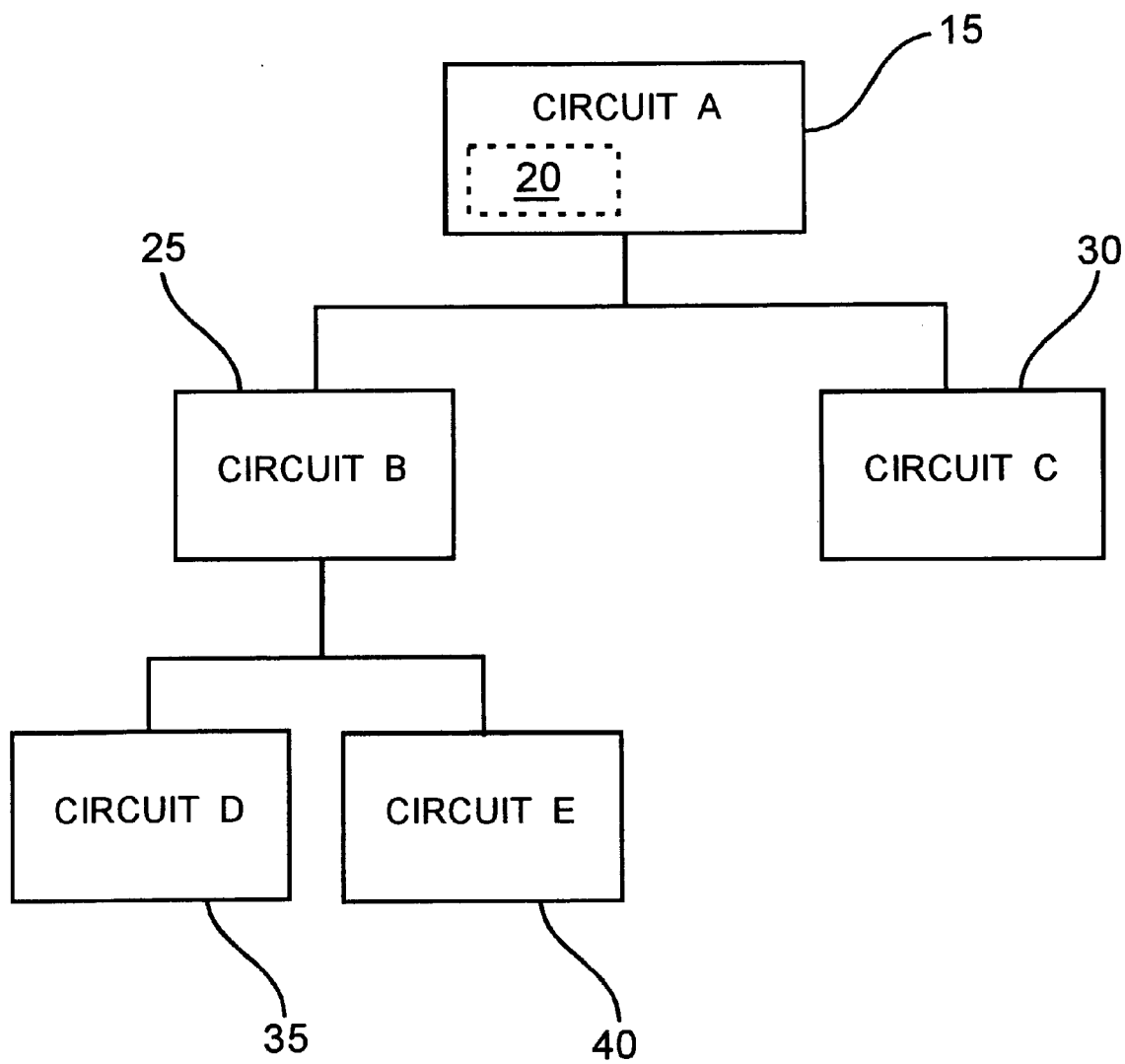
FIG. 1 is a diagrammatic representation of an upstream circuit breaker and a plurality of downstream circuit breakers illustrating a circuit breaker interconnect arrangement according to the present invention.

An electrical circuit system and circuit breaker interconnect arrangement according to the present invention is illustrated in FIG. 1. The method for selective interruption of the electrical circuit system of the present invention is described in greater detail in the flow charts of FIGS. 2 and 3. In FIG. 1, upstream circuit A is protected by at least one upstream circuit breaker 15 having an upstream electronic trip unit including a microprocessor 20. The upstream circuit breaker 15 is arranged for interrupting current through the protected upstream circuit A. The upstream circuit A connects to a plurality of downstream circuits illustrated in FIG. 1 as circuits B through E. Each downstream circuit, circuit B through E, is protected by at least one downstream circuit breaker, downstream circuit breakers 25, 30, 35, and 40, respectively. Each downstream circuit breaker 25, 30, 35 and 40, respectively, has a downstream electronic trip unit including a predetermined time delay for tripping wherein each of the downstream circuit breakers 25, 30, 35 and 40, respectively, is arranged for interrupting current through the corresponding protected downstream circuit, circuits B through E, respectively.

In one embodiment of the method for selective interruption of the electrical system of the present invention, at the occurrence of a predetermined load condition through the upstream circuit A, the microprocessor 20 transmits a trip command signal to the downstream electronic trip units of the downstream circuit breakers 25, 30, 35 and 40, respectively. One or more of the downstream electronic trip units enters the predetermined time delay for tripping and interrupts current through the corresponding protected downstream circuit, circuits B through E, until the load condition at the upstream circuit A is reduced below the predetermined load condition whereby the upstream circuit breaker 15 is deterred from interrupting current in the upstream circuit A. The predetermined load condition may be set at any designated critical condition such as, for example, when the upstream circuit breaker 15 is a predetermined number of seconds from tripping, or, for example, at the occurrence of an overload condition through the upstream circuit A.

In another embodiment of the present invention, the downstream circuits are designated as critical or sheddable wherein, at the occurrence of a predetermined load condition through the upstream circuit, the microprocessor 20 transmits the trip command signal to the downstream electronic trip units of the downstream circuit breakers 25, 30, 35 and 40, respectively. The downstream circuit breakers corresponding to the sheddable downstream circuits are tripped before the downstream circuit breakers corresponding to the critical downstream circuits until the load condition at the upstream circuit A is reduced below the predetermined load condition and the upstream circuit breaker 15 is deterred from interrupting current in the upstream circuit A.

For example, downstream circuits D and E, and corresponding downstream circuit breakers 35 and 40, respectively, are designated as sheddable, and downstream circuits B and C and corresponding downstream circuit breakers 25 and 30, respectively, are designated as critical. When the microprocessor 20 transmits the trip command signal to the downstream electronic trip units of the downstream circuit breakers 25, 30, 35 and 40, respectively, the downstream circuit breakers 35 and 40 corresponding to the downstream circuits D and E, respectively, designated as sheddable will trip first beginning with the downstream circuit D and E having the shortest predetermined time delay for tripping. The downstream circuit breakers 35 and 40 will be tripped until the load condition at the upstream circuit A is reduced below the predetermined load condition. If, after all of the sheddable downstream circuits D and E have been interrupted, the load condition at the upstream circuit A is not reduced below the predetermined load condition, then the downstream circuit breakers 25 and 30 corresponding to the downstream circuits B and C, respectively, designated as critical will trip next, beginning with the downstream circuit B and C having the shortest predetermined time delay for tripping. The method for selective interruption of the electrical circuit system including critical and sheddable circuits is described in greater detail in the flow chart of FIG. 3. The method and system of the present invention is also applicable wherein circuit B is the upstream circuit to downstream circuits D and E wherein a microprocessor (not illustrated) at circuit breaker 25 transmits trip command signals to downstream circuit breakers 35 and 40.

The method and system of the present invention includes a means, such as for example, a microprocessor, in the electronic trip unit of an upstream circuit breaker that provides signal and response circuits such that an upstream electronic trip unit that has entered a predetermined load condition, such as an overload condition, can command any downstream electronic trip unit to trip immediately. The downstream electronic trip unit corresponds to a downstream circuit in an overload condition, or a predetermined priority of circuits such as circuits designated sheddable or critical. The method of the present invention isolates the overload and keeps the remaining circuits in operation. The signalization and response logic in the electronic trip units is provided, for example, by software algorithms or through hardware in an integrated circuit. A "smart" circuit breaker employing a microprocessor and related ROM and RAM memory can include internal operating programs and external connections with circuit interrupters having an electronic trip unit and an electrically actuated accessory-actuator unit. Time setting controls on the electronic trip units also provide for a user to input priority levels of time delays for tripping.

The system of the present invention is also configured such that the downstream electronic trip units are provided with variable and settable delay times for tripping. For example, a downstream electronic trip unit of a downstream circuit breaker initiates a timing cycle upon receiving a trip command signal from the microprocessor at the upstream circuit breaker. Thus, the downstream circuit breakers are tripped whether or not the corresponding downstream circuit are in an overload condition, with the downstream circuit breaker having the shortest time delay tripping first, until the upstream circuit is reduced below the predetermined load condition.

In another embodiment of the present invention, any downstream circuit breaker corresponding to a downstream circuit in an overload condition, for example, sets its own delay time for tripping to zero or to an immediate trip setting, tripping instantaneously upon receiving the trip command from the upstream circuit breaker. The time delays for tripping set on each downstream circuit breaker would be predetermined and, for example, designated by the criticality of the circuit corresponding to each circuit breaker. The method and system of the present invention allows circuit loads to be shed according to a priority whenever a predetermined load such as an overload event is encountered, preserving the operation of critical circuits.

The system and method of the present invention is different from the zone selective interlock (ZSI) system in that a signal is not sent from the downstream circuit breakers to the upstream or main circuit breakers when the downstream circuit breakers are in overload. In the system of the present invention, a signal is only sent when the upstream or main circuit is in a predetermined load condition, such as an overload condition. If the downstream circuits are in overload, the corresponding downstream circuit breaker will simply trip after the preset time delay for tripping.

Figure 2:
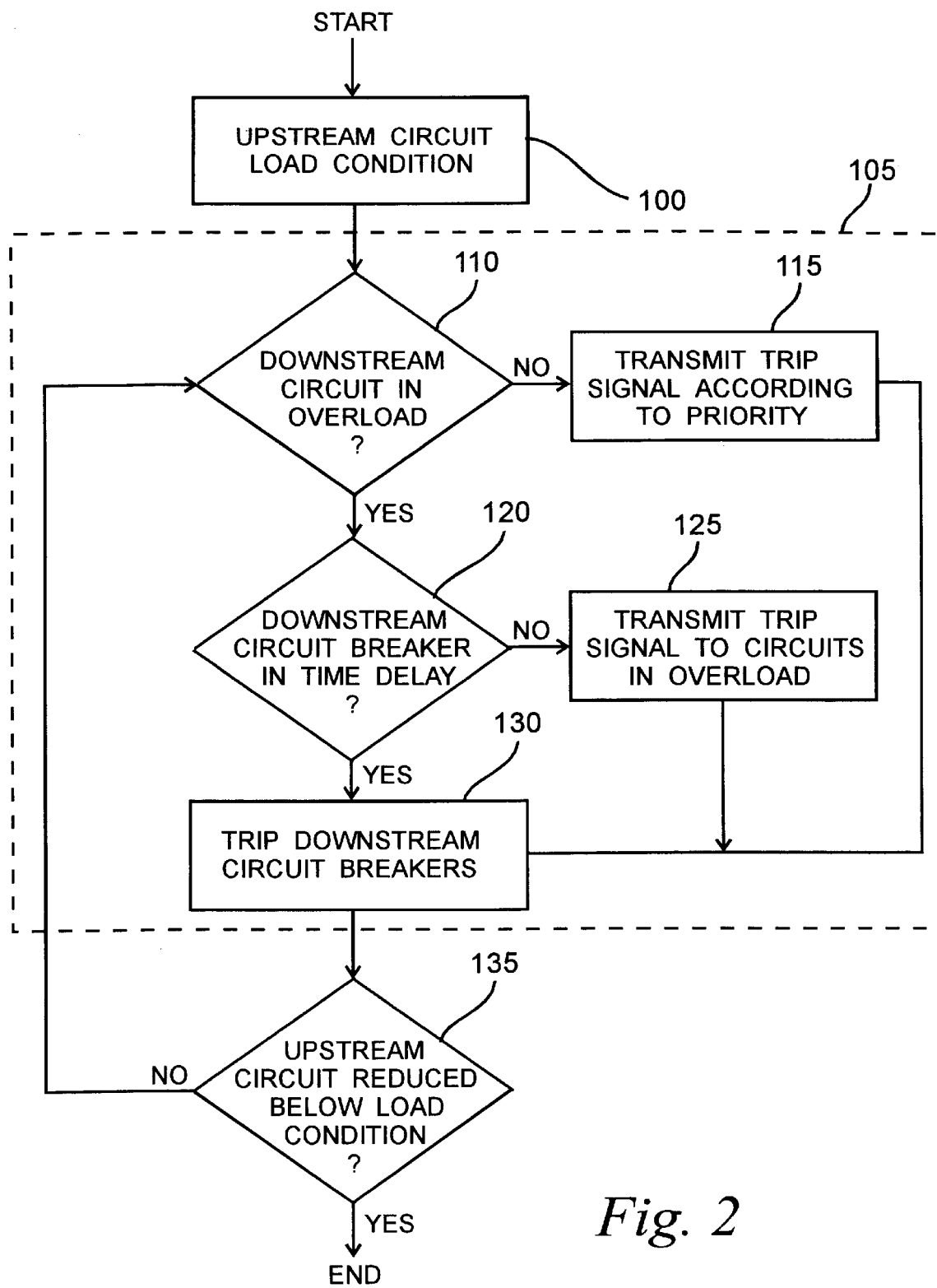
FIG. 2 is a flow chart representation of an embodiment of the method for selective interruption of the electrical circuit system of FIG. 1.

FIG. 2 is a flow chart representation of an embodiment of the method for selective interruption of the electrical circuit system illustrated in FIG. 1. The instructions to the microprocessor for performing selective interruption of the electrical circuit system according to the present invention are as follows. Upon starting, the microprocessor is initialized at block 100 at the occurrence of a predetermined load condition, such as for example, an overload or overcurrent condition through the upstream circuit.

At section 105 a trip command signal is transmitted from the microprocessor to the downstream electronic trip units. An inquiry is made at block 110 to determine whether one or more of the downstream circuits are in an overload condition causing the predetermined load condition through the upstream circuit. If there are no downstream circuits in an overload condition then the microprocessor transmits the trip command signal to the downstream circuit breakers according to a predetermined priority at block 115. The priority can be determined, for example, by the predetermined time delays for tripping set on each downstream circuit breaker or by designated critical and sheddable downstream circuits as described in greater detail in FIG. 3. As another option, if the overload condition on the upstream circuit is not due to an overload conditions on any downstream circuit, then the upstream circuit breaker will trip after a normal time delay.

If there are one or more downstream circuits in an overload condition then the microprocessor transmits the trip command signal to the downstream electronic trip units corresponding to the downstream circuits in the overload condition at block 125 if it is determined that the downstream electronic trip units have not already entered into the predetermined time delay for tripping per block 120. The predetermined time delay for tripping for the downstream electronic trip units corresponding to the downstream circuits in the overload condition may, for example, be set to an immediate trip setting at the occurrence of the overload condition through the corresponding downstream circuit.

After the trip command has been sent, the downstream circuit breakers receiving the trip command signal from the microprocessor are tripped per block 130 wherein the current is interrupted through the corresponding downstream circuits. The process continues until a determination is made per block 135 that the load condition at the upstream circuit is reduced below the predetermined load condition whereby the upstream circuit breaker is deterred from interrupting current in the upstream circuit.

Figure 3:
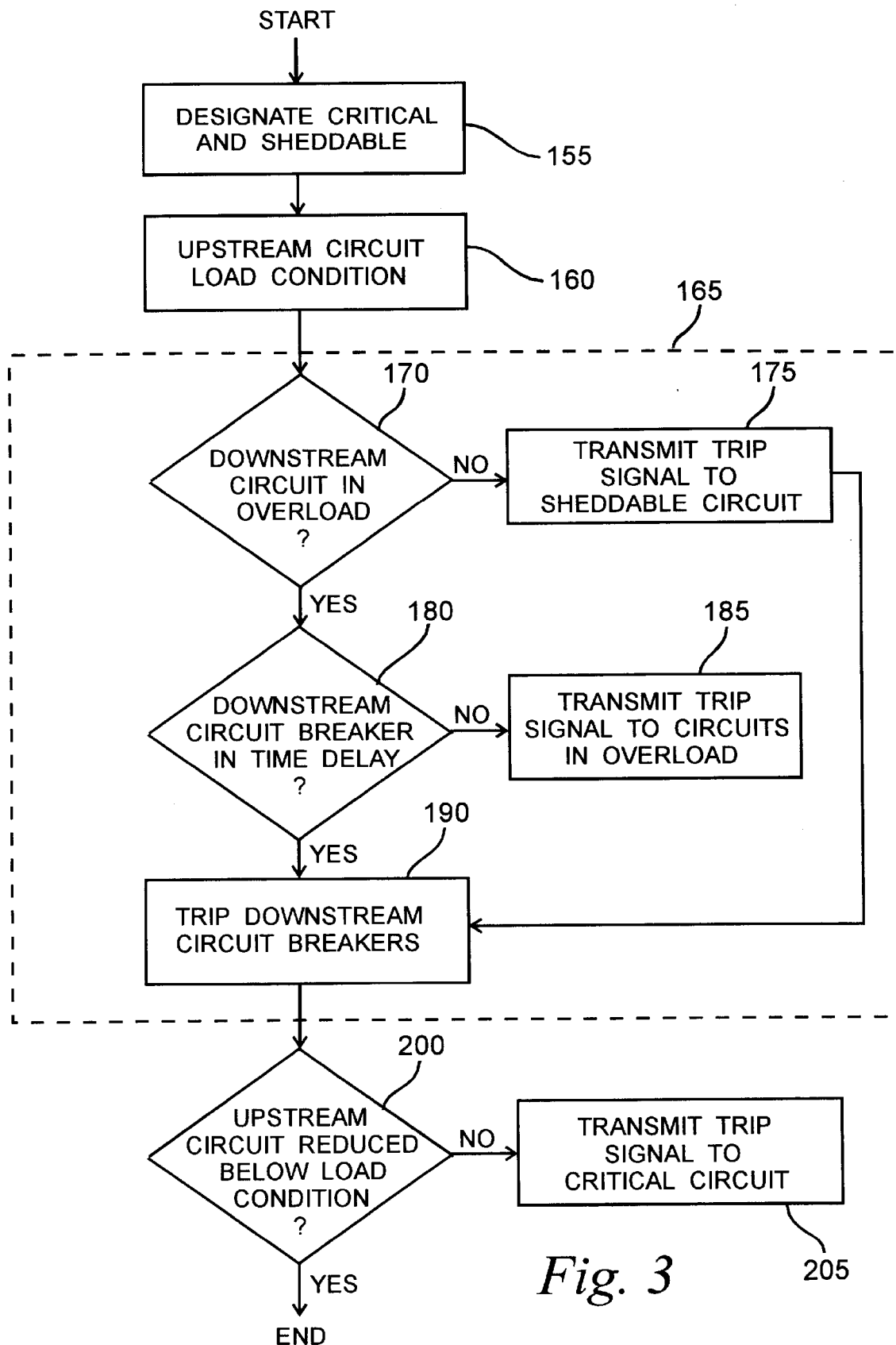
FIG. 3 is a flow chart representation of another embodiment of the method for selective interruption of the electrical circuit system of FIG. 1.

FIG. 3 is a flow chart representation of another embodiment of the method for selective interruption of the electrical circuit system illustrated in FIG. 1. The instructions to the microprocessor for performing selective interruption of the electrical circuit system according to the second embodiment of the present invention are as follows. Upon starting, one or more downstream circuits are designated as critical and one or more downstream circuits are also designated as sheddable per block 155. Critical circuits include, for example, emergency lighting and circuits supporting medical and computer equipment. Sheddable circuits include circuits supporting peripheral equipment such as air conditioners, machinery, or circuits supporting certain floors of an office building identified as non-critical. The microprocessor is initialized at block 160 at the occurrence of a predetermined load condition, such as for example, an overload or overcurrent condition through the upstream circuit.

At section 165 a trip command signal is transmitted from the microprocessor to the downstream electronic trip units. An inquiry is made at block 170 to determine whether one or more of the downstream circuits is in an overload condition causing the predetermined load condition through the upstream circuit. If there are no downstream circuits in an overload condition then the microprocessor transmits the trip command signal to the sheddable downstream circuit breakers according to a predetermined priority at block 175. The downstream circuit breakers corresponding to the sheddable downstream circuits are tripped before the downstream circuit breakers corresponding to the critical downstream circuits according to a predetermined priority.

However, if there are any downstream circuits in an overload condition then the microprocessor transmits the trip command signal to the downstream electronic trip units corresponding to the downstream circuits in the overload condition at block 185 if it is determined that the downstream electronic trip units have not already entered into the predetermined time delay for tripping per block 180. The downstream electronic trip units corresponding to the downstream circuits in the overload condition are tripped before the downstream circuit breakers corresponding to the sheddable downstream circuits are tripped. The predetermined time delay for tripping for the downstream electronic trip units corresponding to the downstream circuits in the overload condition may, for example, be set to an immediate trip setting at the occurrence of the overload condition through the corresponding downstream circuit.

After the trip command has been sent, the downstream circuit breakers receiving the trip command signal from the microprocessor are tripped per block 190 wherein the current is interrupted through the corresponding downstream circuits. An inquiry is made at block 200 to determine whether the load condition at the upstream circuit is reduced below the predetermined load condition. If, after all of the downstream circuit breakers corresponding to downstream circuits in an overload condition and all of the downstream circuit breakers designated as sheddable have been tripped and the load condition at the upstream circuit is still not reduced below the predetermined load condition, then the microprocessor transmits the trip command signal per block 205 to the downstream circuit breakers designated as critical according to a predetermined priority. The process continues until a determination is made per block 200 that the load condition at the upstream circuit is reduced below the predetermined load condition whereby the upstream circuit breaker is deterred from interrupting current in the upstream circuit. Therefore, the present invention allows circuit loads to be shed according to a priority whenever a predetermined load such as an overload event is encountered, preserving the operation of critical circuits.

The system and method of the present invention as described is different from the zone selective interlock (ZSI) system in that a signal is not sent from the downstream circuit breakers to the upstream or main circuit breakers when the downstream circuit breakers are in overload. In the present invention, a trip command signal is sent when the upstream or main circuit is in a predetermined load condition, such as an overload condition. The ZSI's view is "upstream" providing a restraint signal to the upstream circuit breaker, however, the present invention signals "downstream" and allows progressive shedding as well as instantaneous relief The method and system of the present invention applies to any system including main and branch circuit breakers or controllable protective elements such as fused switches incorporated through timing logic that would activate a switch tripping means equipped with a variable priority timeout logic.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. A method for selective interruption of an electrical circuit system comprising:
   providing at least one upstream circuit breaker having an upstream electronic trip unit including a microprocessor for interrupting current through a protected upstream circuit in the electrical circuit system;
   providing a plurality of downstream circuit breakers connected to the upstream circuit breaker for interrupting current through corresponding protected downstream circuits, each downstream circuit breaker having a downstream electronic trip unit including a predetermined time delay for tripping;
   transmitting a trip command signal from the microprocessor to the downstream electronic trip units at the occurrence of a predetermined load condition through the upstream circuit; and
   tripping the one or more downstream circuit breakers after the predetermined time delay for tripping wherein current is interrupted through the corresponding protected downstream circuit until the load condition at the upstream circuit is reduced below the predetermined load condition whereby the upstream circuit breaker is deterred from interrupting current in said upstream circuit.

2. A method, as recited in claim 1, wherein said predetermined load condition is an overload condition.

3. A method, as recited in claim 1, further comprising:
   determining, at the occurrence of an overload condition through the upstream circuit, whether said overload condition through the upstream circuit is due to an overload condition through one or more of said downstream circuits;
   transmitting the trip command signal from the microprocessor to the downstream electronic trip units corresponding to the downstream circuits in the overload condition; and
   tripping the one or more downstream circuit breakers corresponding to the downstream circuits in the overload condition after the predetermined time delay for tripping wherein current is interrupted through said downstream circuits until the load condition at the upstream circuit is reduced below the overload condition.

4. A method, as recited in claim 3, wherein, the predetermined time delay for tripping for the downstream electronic trip units corresponding to the downstream circuits in the overload condition is set to an immediate trip setting at the occurrence of the overload condition through the downstream circuit.

5. A method, as recited in claim 1, further comprising:
   designating one or more downstream circuits as critical and one or more downstream circuits as sheddable wherein, at the receipt of the trip command signal from the microprocessor, the downstream circuit breakers corresponding to the sheddable downstream circuits are tripped before the downstream circuit breakers corresponding to the critical downstream circuits according to a predetermined priority.

6. A method, as recited in claim 5, further comprising:
   determining whether one or more downstream circuits is in an overload condition; and
   tripping the downstream circuit breakers corresponding to the downstream circuits in the overload condition first.

7. A method for selective interruption of an electrical circuit system comprising:
   providing at least one upstream circuit breaker having an upstream electronic trip unit including a microprocessor for interrupting current through a protected upstream circuit in the electrical circuit system;
   providing a plurality of downstream circuit breakers connected to the upstream circuit breaker for interrupting current through corresponding protected downstream circuits, each downstream circuit breaker having a downstream electronic trip unit including a predetermined time delay for tripping;
   determining, at the occurrence of an overload condition through the upstream circuit, whether said overload condition through the upstream circuit is due to an overload condition through one or more of said downstream circuits;
   transmitting a trip command signal from the microprocessor to the downstream electronic trip units corresponding to the downstream circuits in the overload condition; and
   tripping one or more downstream circuit breakers corresponding to the downstream circuits in the overload condition after the predetermined time delay for tripping wherein current is interrupted through said downstream circuits until the load condition at the upstream circuit is reduced below overload condition whereby the upstream circuit breaker is deterred from interrupting current in said upstream circuit.

8. A method, as recited in claim 7, wherein, the predetermined time delay for tripping for the downstream electronic trip units corresponding to the downstream circuits in the overload condition is set to an immediate trip setting at the occurrence of the overload condition through the downstream circuit.

9. A method, as recited in claim 7, further comprising:
   designating one or more downstream circuits as critical and one or more downstream circuits as sheddable wherein, at the receipt of the trip command signal from the microprocessor, the downstream circuit breakers corresponding to the sheddable downstream circuits are tripped before the downstream circuit breakers corresponding to the critical downstream circuits according to a predetermined priority.

10. A method, as recited in claim 9, further comprising:
   determining whether one or more downstream circuits is in an overload condition; and tripping the downstream circuit breakers corresponding to the downstream circuits in the overload condition first.

11. A method for selective interruption of an electrical circuit system comprising:

providing at least one upstream circuit breaker having an upstream electronic trip unit including a microprocessor for interrupting current through a protected upstream circuit in the electrical circuit system;

providing a plurality of downstream circuit breakers connected to the upstream circuit breaker for interrupting current through corresponding protected downstream circuits, each downstream circuit breaker having a downstream electronic trip unit including a predetermined time delay for tripping;

designating one or more downstream circuits as critical and one or more downstream circuits as sheddable;

transmitting the trip command signal from the microprocessor to the downstream electronic trip units at the occurrence of a predetermined load condition through the upstream circuit; and tripping one or more downstream circuit breakers after the predetermined time delay for tripping wherein the downstream circuit breakers corresponding to the sheddable downstream circuits are tripped before the downstream circuit breakers corresponding to the critical downstream circuits according to a predetermined priority until the load condition at the upstream circuit is reduced below the predetermined load condition whereby the upstream circuit breaker is deterred from interrupting current in said upstream circuit.

12. A method, as recited in claim 11, wherein said predetermined load condition is an overload condition.

13. A method, as recited in claim 11, further comprising:

determining whether one or more downstream circuits is in an overload condition; and tripping the downstream circuit breakers corresponding to the downstream circuits in the overload condition first.

14. A circuit breaker interconnect arrangement comprising:

at least one upstream circuit breaker having an upstream electronic trip unit including a microprocessor, the at least one upstream circuit breaker arranged for interrupting current through a protected upstream circuit;

a plurality of downstream circuit breakers connected to the upstream circuit breaker, each downstream circuit breaker having a downstream electronic trip unit including a predetermined time delay for tripping wherein each of the downstream circuit breakers is arranged for interrupting current through a corresponding protected downstream circuit; and wherein, at the occurrence of a predetermined load condition through the upstream circuit, the microprocessor transmits a trip command signal to the downstream electronic trip units wherein one or more of the downstream electronic trip units enters the predetermined time delay for tripping and interrupts current through the corresponding protected downstream circuit until the load condition at the upstream circuit is reduced below the predetermined load condition whereby the upstream circuit breaker is deterred from interrupting current in said upstream circuit.

15. A circuit breaker interconnect arrangement, as recited in claim 14, wherein, at the occurrence of an overload condition through at least one downstream circuit and at the receipt of the trip command, the downstream circuit breaker corresponding to said downstream circuit in the overload condition trips immediately interrupting current through said downstream circuit.

16. A circuit breaker interconnect arrangement, as recited in claim 14, wherein said predetermined load condition is an overload condition.

17. A circuit breaker interconnect arrangement comprising:

at least one upstream circuit breaker having an upstream electronic trip unit including a microprocessor, the at least one upstream circuit breaker arranged for interrupting current through a protected upstream circuit;

a plurality of critical downstream circuits connected to the upstream circuit wherein each critical downstream circuit includes a corresponding downstream circuit breaker having a downstream electronic trip unit including a predetermined time delay for tripping wherein the downstream circuit breaker is arranged for interrupting current through the corresponding critical downstream circuit;

a plurality of sheddable downstream circuits connected to the upstream circuit wherein each sheddable downstream circuit includes a corresponding downstream circuit breaker having a downstream electronic trip unit including a predetermined time delay for tripping wherein the downstream circuit breaker is arranged for interrupting current through the corresponding sheddable downstream circuit;

wherein, at the occurrence of a predetermined load condition through the upstream circuit, the microprocessor transmits a trip command signal to the downstream electronic trip units wherein the downstream circuit breakers corresponding to the sheddable downstream circuits are tripped before the downstream circuit breakers corresponding to the critical downstream circuits according to a predetermined priority until the load condition at the upstream circuit is reduced below the predetermined load condition whereby the upstream circuit breaker is deterred from interrupting current in said upstream circuit.

18. A circuit breaker interconnect arrangement, as recited in claim 17, wherein said predetermined load condition is an overload condition.

19. A circuit breaker interconnect arrangement, as recited in claim 17, wherein the downstream circuit breaker corresponding to a downstream circuit in an overload condition is tripped first.

* * * * *